United States Patent [19]

Ingle et al.

[11] 3,927,702

[45] Dec. 23, 1975

[54] EMERGENCY OVER-FILL ASSEMBLY FOR MARINE VESSELS

[75] Inventors: James E. Ingle; Ralph W. Emerson; John S. Megahan, all of Tell City, Ind.

[73] Assignee: Maxon Marine Industries, Inc., Tell City, Ind.

[22] Filed: Nov. 1, 1974

[21] Appl. No.: 519,877

[52] U.S. Cl. ............................ 141/285; 137/533.21
[51] Int. Cl.² ......................................... B65B 31/00
[58] Field of Search ................ 141/1, 5, 52, 53–61, 141/84, 93, 285, 289, 290, 295, 298–300, 303, 307–310, 236, 115; 137/587, 588, 533.21; 251/82

[56] References Cited
UNITED STATES PATENTS 345,197   7/1886   Wade .................................. 251/82

3,840,056   10/1974   Bower .................................. 141/59

*Primary Examiner*—Houston S. Bell, Jr.
*Attorney, Agent, or Firm*—James E. Nilles

[57] ABSTRACT

An emergency over-fill assembly for marine vessels for use during cargo filling operations of the vessel and which prevents over-stressing of the compartment being filled due to over-filling. During the filling operation, the emergency over-fill assembly is unlocked to permit pressure to be released from the compartment being filled when the pressure rises above a predetermined point, which pressure is usually higher than the pressure released by conventional pressure-vacuum valves in the compartment. The emergency over-fill assembly can be closed tightly when the filling operation is completed and prevents cargo loss even if the vessel is submerged.

7 Claims, 5 Drawing Figures

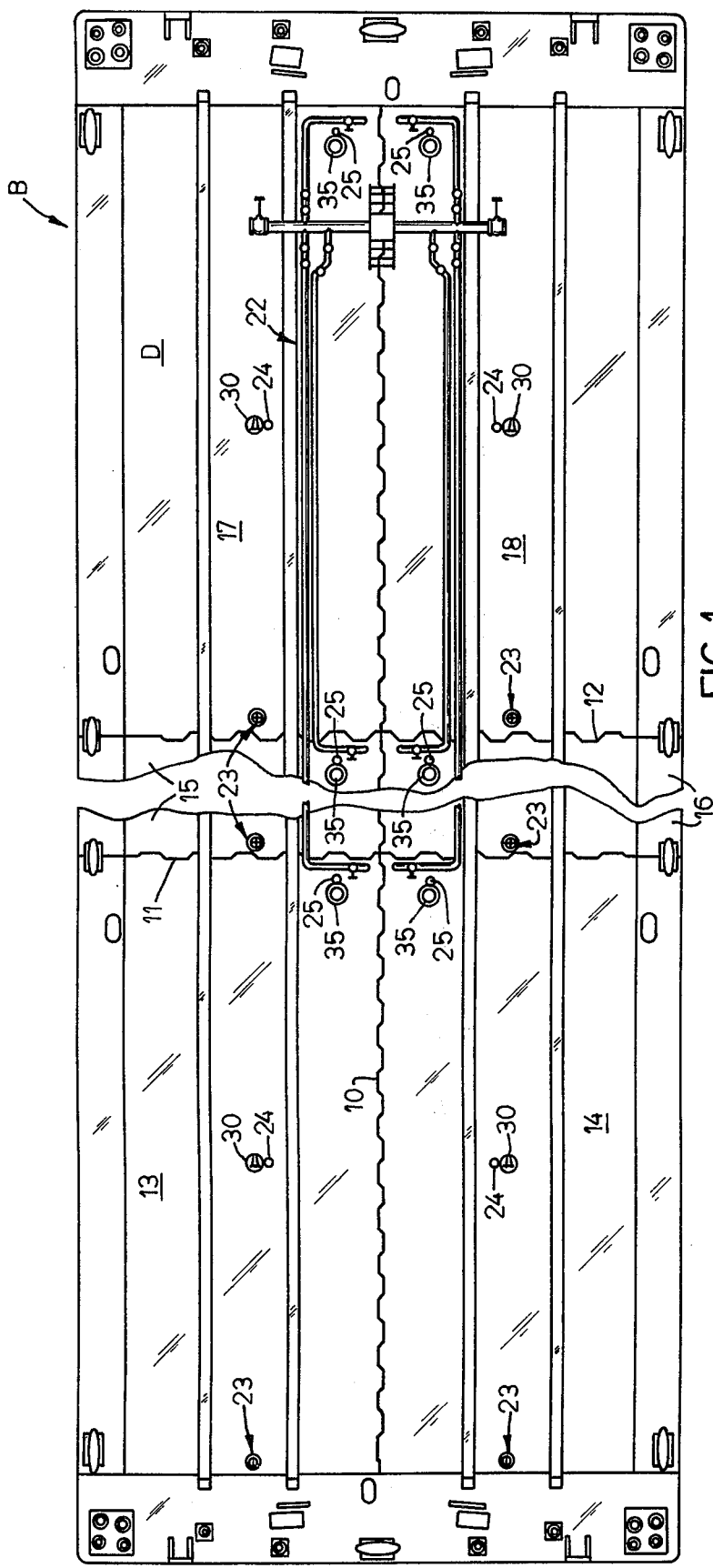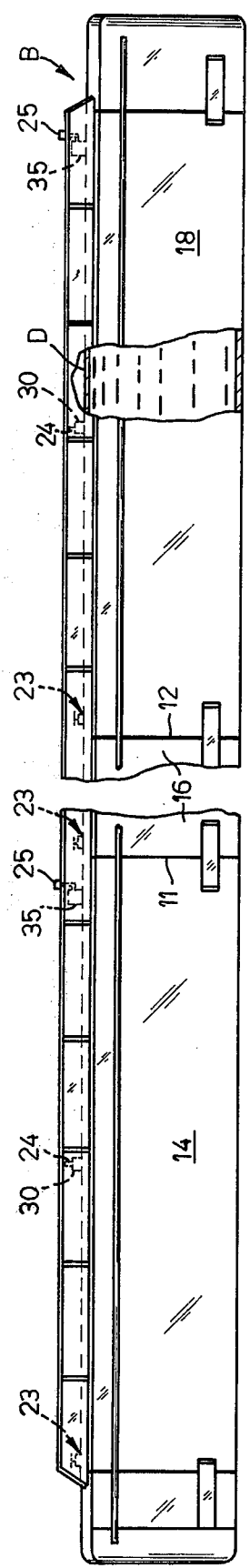

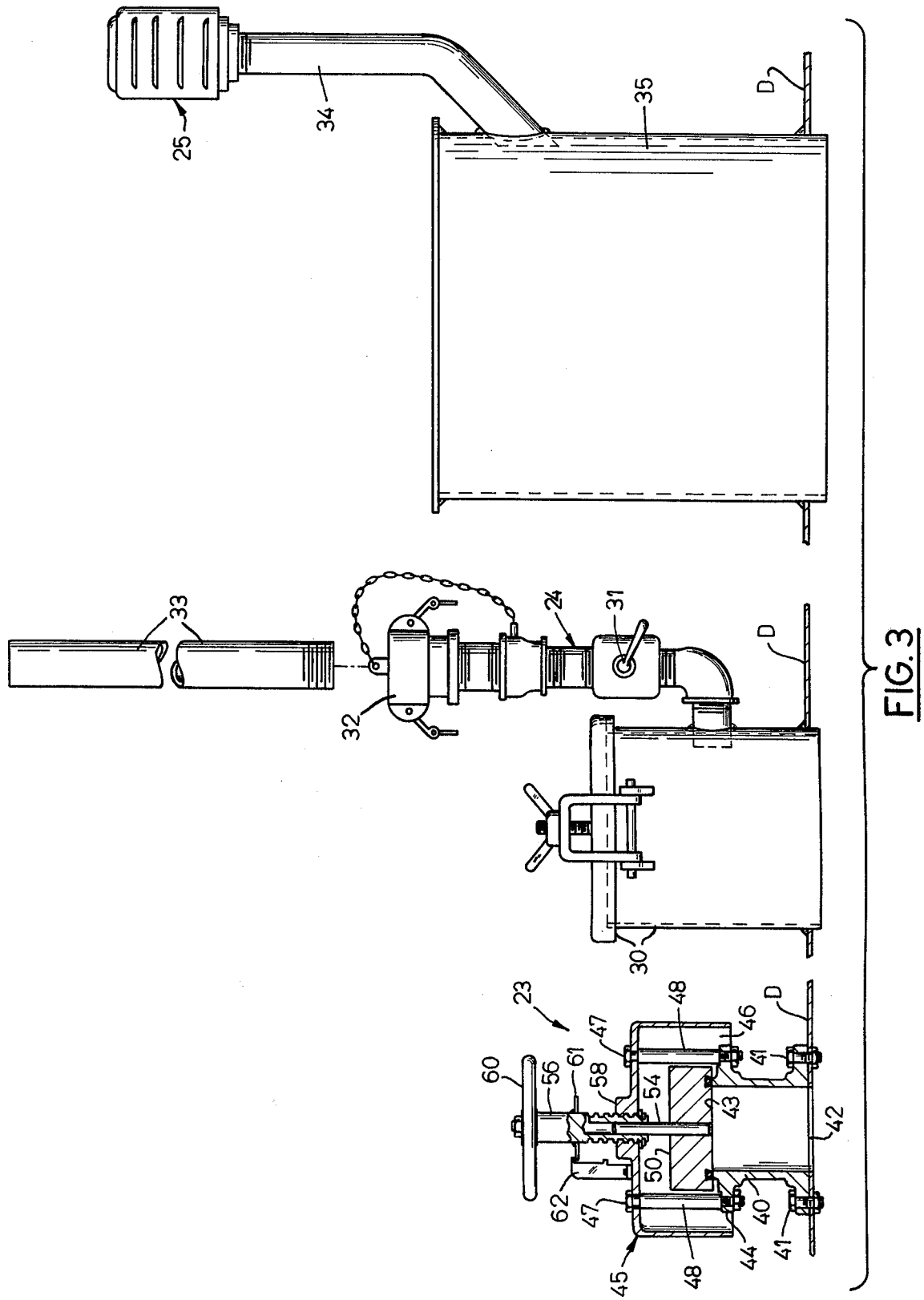

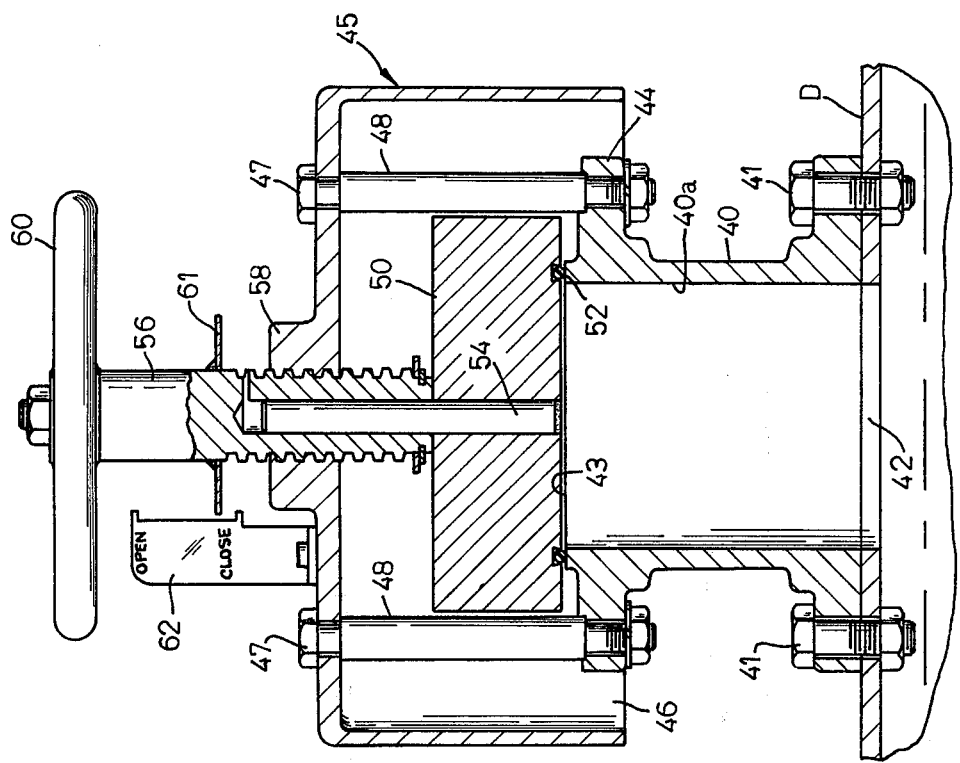
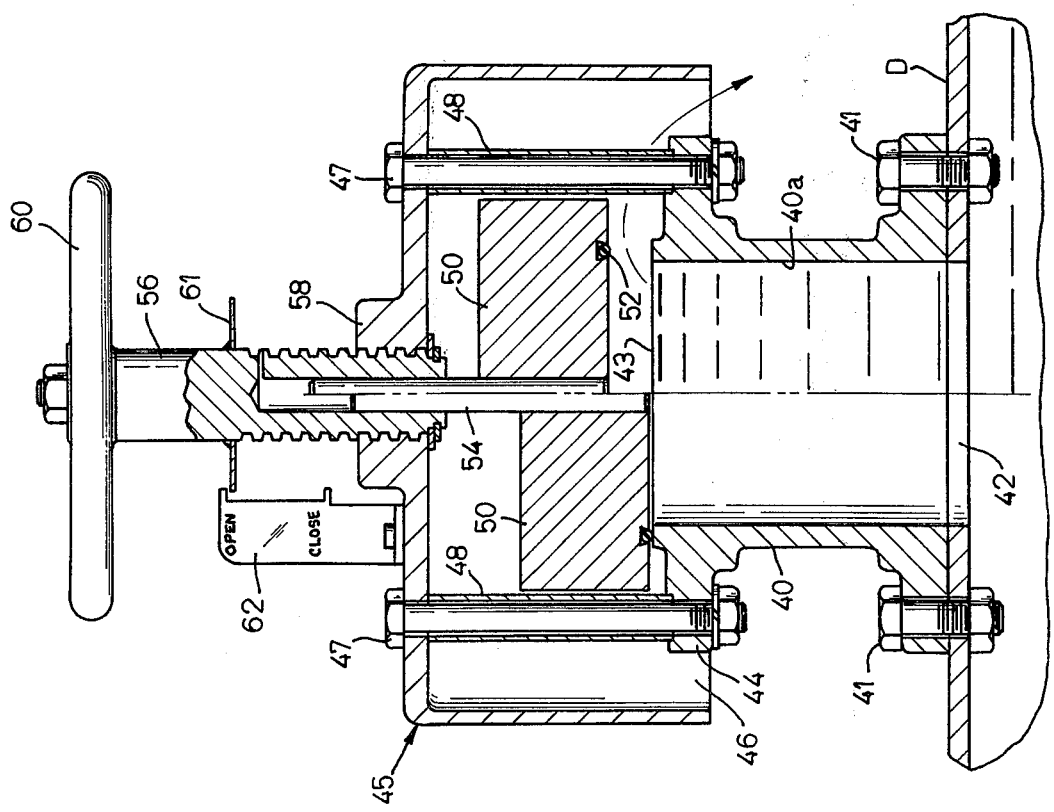

EMERGENCY OVER-FILL ASSEMBLY FOR MARINE VESSELS

BACKGROUND OF THE INVENTION

Various devices have been proposed for alerting the tankerman to over-fill conditions of a compartment being loaded with cargo. Some of these prior art devices included alarm systems, but were not reliable and they further encouraged the tankerman to wait for a particularly dangerous signal.

Regulations require that the compartment being filled is vented to the atmosphere at least twelve feet above the deck of the vessel. As a result, the upwardly extending vent pipe would become filled with the cargo at overfill conditions and the head of the cargo in the vent pipe would cause excessive build-up of pressure in the compartment which could result in damage. Not only were hulls of vessels damaged with prior art devices but also the cargo was lost because of spill.

SUMMARY OF THE INVENTION

The present invention provides an emergency over-fill assembly for a marine vessel and which prevents excessive pressure build-up in the compartment being filled. The assembly provided by the present invention remains sealed until a predetermined pressure is developed and then it automatically opens to release the pressure. Furthermore, the assembly automatically opens when over-fill occurs and it permits over-fill but restricts and confines the over-fill on the deck of the vessel. The assembly provided by the present invention can also be locked in place after the filling operation and is leakproof even though the vessel may become submerged. The invention provides an automatically operating emergency over-fill assembly which prevents pressure build-up in the compartment, due for one thing, to the pressure caused by the head of cargo which would otherwise accumulate in conventional vent pipes above the deck.

The emergency over-fill assembly of the present invention is automatic in operation, reliable in performing the functions for which it was designed, and is easily operated and results in the ability to use economical pressure-vacuum valves and portable vent connections.

These and other objects and advantages of the present invention will appear hereinafter as this disclosure progresses, reference being had to the accompanying drawings.

BRIEF DESCRIPTION OF THE DRAWINGS

FIG. 1 is a plan view of a barge embodying the present invention, the central portion of the barge being shown as broken away;

FIG. 2 is an elevational view of the barge shown in FIG. 1;

FIG. 3 are elevational views of the emergency over-fill assembly as provided by the present invention, a conventional vent connection, and a conventional pv valve which are all shown in FIG. 1, FIG. 3 being on an enlarged scale from FIG. 1 and furthermore the emergency over-fill assembly being shown in section;

FIGS. 4 and 5 are enlarged, elevational views of the emergency over-fill assembly shown in FIG. 3, the views being shown in cross-section and furthermore the assembly as shown in FIG. 4 being in the unlocked position and showing one-half of the sealing member when raised to the release position, FIG. 5 showing the sealing member when in the locked, under-way position.

DESCRIPTION OF A PREFERRED EMBODIMENT

The invention is applicable to ships, barges or the like and FIGS. 1 and 2 illustrate the invention as applied to a barge B having a deck D, a longitudinal bulkhead 10 and two transverse bulkheads 11 and 12 which divide the barge into six separate compartments 13, 14, 15, 16, 17, and 18. Each of the compartments can be separately filled by the fill conduits 22 in the known manner. Each of the compartments is equipped with an emergency over-fill assembly 23 and also with a portable vent connection 24 and a conventional pressure-vacuum valve 25.

Certain Coast Guard requirements must be complied with in vessels of the type to which the present invention is concerned. For one thing, regulations require that when a compartment is being filled with cargo, the vapor in the compartment must be vented to the atmosphere at least 12 feet above the deck. As a result, it is possible to over-stress the compartment by over-filling and forcing the liquid being pumped into the compartment to go up the vent stack. The resulting pressure due to the liquid cargo in the stack would exert high, detrimental forces on the compartment being filled. More specifically, the vent connection 24 is shown clearly in FIG. 3 as being attached to a conventional Butterworth hatch 30. This vent connection 24 is known as a portable vent connection and has a shiftable valve element 31 and removable cap 32. The cap is secured tightly in place when the vessel is underway, but when the compartment is being loaded, the cap 32 is removed and a conventional vent pipe 33 is inserted in the connection. The pipe is of sufficient height so that the compartment is vented to atmosphere at least 12 feet above the deck D. It is this pipe 33 that conventionally may become filled with cargo during the compartment filling operation, thereby causing excessive pressure in the compartment. When the compartment filling operation has been completed, the pipe 33 is removed from the connection and the cap 32 is again tightly secured in place.

As also shown in FIG. 3, a conventional pressure-vacuum valve 25 is provided for each compartment and has been shown as being in communication via pipe 34 with the conventional expansion trunk 35 that is in communication through the deck D with the compartment. The valve 25 is set to open at a pre-determined pressure. Valve 25 is for pressure-vacuum venting and automatically limits the pressure or vacuum in the tank to design limits.

The emergency over-fill assembly 23 of the present invention and shown in detail in FIGS. 4 and 5 includes a tubular mounting part 40 which is secured by bolt means 41 extending through to the deck D and the opening 40a communicates through an aperture 42 in the deck with the interior of the compartment. The mounting part 40 terminates at its upper end in a flat sealing surface 43 and also has an upper flange 44. A cargo diverting cover 45 of inverted cup-shape has an opening 46 facing downwardly and is secured by bolt means 47 and spacer tubes 48 to the flange 44. This cover 45 is of a sufficient size to extend completely around the mounting part 40 and extends over the upper portion of the mounting part 40.

The assembly 23 includes a vertically shiftable sealing member 50 for abutting against the upper open end 43 of the tubular mounting part 40 and is shiftable to an upper position wherein the part 40 is open. This disc shaped sealing means has a fluid seal means 52 such as a conventional, flexible O-ring. However, depending on the type of cargo being filled, the seal means 52 may be of different materials which are compatible with cargo. A central stem 54 is fixed in the member 50 and extends upwardly through the cover 45. Releasable locking means are provided for the member 50 and includes a lock bolt 56 threadably engaged in the central, top, enlarged portion 58 of the cover 45 and has an adjustable wheel handle 60 secured thereto. A position indicating member 61 is fixed to the lock bolt and an indicator 62, which cooperates with the indicator member 61, is fixed to the upper side of the cover 45. Thus, the open and closed positions of the emergency over-fill assembly 23 is readily observed by the tankerman.

As shown in FIG. 5, the lock bolt 56 has been rotated to cause it to move downwardly and thereby lock the member 50 in sealing engagement with the member 40. This is the position of the assembly when the vessel is under-way or at least when the compartment is not being filled.

FIG. 4 indicates the position of the lock bolt in the assembly, unlocked position where guide stem 54 and its sealing member 50 are free to rise and fall depending on the pressure in the compartment. More specifically, the left side of FIG. 3 shows the sealing member 50 when in the sealing position, but when it is also free to rise if a certain pressure is exceeded in the compartment. The right end side of FIG. 4 shows the sealing member 50 when it is raised to the release position as, for example, by excessive pressure in the compartment or when the cargo rises in the member 40 to an over-fill condition. In the case of over-fill, the downwardly facing cover 45 causes the material to be confined adjacent the assembly and in a localized spill area.

Thus, if by accident, the compartment is over-filled to a point where the material tried to escape through the vent line 33, pressure would raise in the compartment due to the size of the vent line in comparison to the fill conduit 22 and due to the twelve foot head in the vent line, the emergency over-fill assembly 23 would then automatically open.

The emergency over-fill assembly 23 is made to open at a higher pressure than the pressure-vacuum valve 25. Furthermore, the cross sectional area of the emergency over-fill assembly is at least equal to the fill conduit 22.

With the present invention, the vent connection 24 and the valve 25 can be made smaller and more economical and still remain consistent with good engineering practice.

The emergency over-fill assembly 23 is vapor and liquid tight at all times except during venting operation. When in operation, the emergency over-fill assembly will not open due to vacuum, but will open to a predetermined amount of pressure. The asssembly permits an equal volume of liquid to escape as is being forced into the hull at the time over-filling occurs. The assembly provides protection to the barge during filling operation and satisfies cross-sectional area requirements which permit only vapor to escape through the vent stacks.

When the assembly is locked, it remains closed during transportation and will not open due to an accident or in the event the vessel sank.

We claim:

1. An emergency over-fill assembly for relieving excessive pressure or cargo build-up in a compartment in a marine vessel and securable to the deck of said vessel, said assembly comprising a part having an opening therethrough that communicates between the compartment to be filled and atmosphere, said part having an upper end which terminates above said deck, said assembly further including a cover at the upper end of said part, said cover having a passage through which said opening can communicate with atmosphere, a sealing member shiftably mounted within the cover between a compartment sealing position wherein it closes communication between said opening and atmosphere and a compartment open position wherein it permits communication between said opening and atmosphere, locking means adjustably mounted on said cover and having a locked position and an open position, said sealing member engagable by said locking means whereby said locking means when in said locked position acts to hold said sealing member in said compartment sealing position and when said locking member is adjusted to an open position, said sealing member can automatically raise from its compartment sealing position wherein it is maintained by gravity to a release position upon excessive pressure or cargo build-up in said compartment.

2. The assembly set forth in claim 1 further characterized in that said cover is spaced from said opening and has a downwardly facing opening defining said passage whereby excessive cargo passing through said assembly accumulates adjacent to said assembly.

3. An emergency over-fill assembly for relieving excessive pressure or cargo build-up in a compartment in a marine vessel including a mounting part securable to the deck of a vessel, said mounting part having an opening therethrough that communicates between the compartment to be filled and atmosphere, said mounting part having an upper end which terminates above said deck, a cover secured to the upper end of said mounting part and in spaced relationship therefrom and defining a passage through which said opening can communicate with atmosphere, a sealing member shiftably mounted within the cover for movement between a position in sealing engagement with the upper end of said part wherein it closes communication between said opening and atmosphere and an open position above said part wherein it permits communication between said opening and atmosphere, locking means adjustably mounted on said cover and having a locked position and an open position, said sealing member having guide means engagable by said locking means whereby said locking means when in said locking position acts to hold said sealing member in sealing engagement with said mounting part and when said locking member is adjusted to said open position, said sealing member can raise from its sealing position on said mounting part wherein it is maintained by gravity to a release position for releasing excessive pressure or cargo from said compartment.

4. In combination with a marine vessel having an enclosed compartment to be filled with cargo, a vent connection for said compartment for venting said compartment while being filled, and a pressure relief valve for said compartment and set to release pressure over a predetermined amount from said compartment; an emergency over-fill assembly comprising a part having a first opening that communicates with the compartment to be filled and terminates above the deck of said vessel, said assembly having a cover secured to said part and being provided with a downwardly facing opening communicating between said first opening and atmosphere, a sealing member shiftably mounted within the cover and movable between a compartment sealing position where it closes said first opening and a compartment open position wherein it opens said first opening, locking means adjustably mounted on said cover and having a locked position and an open position, said sealing member engageable by said locking means whereby said locking means when in said locked position acts to hold said sealing member in said compartment sealing position, and when said locking member is adjusted to said open position, said sealing member can automatically raise from its sealing position wherein it is maintained by gravity to a release position upon excessive pressure or cargo build-up in said compartment.

5. The combination set forth in claim 4 further characterized in that said sealing member is constructed and arranged to open at a higher pressure in said compartment than that pressure at which said pressure relief valve is set to release pressure from said compartment.

6. The combination set forth in claim 4 including a filling conduit for said compartment, said cross sectional area of said assembly first opening being at least as great as the cross sectional area of said filling conduit.

7. The combination set forth in claim 5 including a filling conduit for said compartment, said cross sectional area of said assembly first opening being at least as great as the cross sectional area of said filling conduit.

* * * * *